United States Patent
Sei et al.

(10) Patent No.: US 12,496,277 B2
(45) Date of Patent: Dec. 16, 2025

(54) GRANULATION COMPOSITION FORMED FROM CORE PARTICLES, COATING PARTICLES AND A BINDER

(71) Applicant: SUNSHO PHARMACEUTICAL CO., LTD., Fuji (JP)

(72) Inventors: Shunsuke Sei, Fujinomiya (JP); Misuzu Mineda, Fujinomiya (JP); Chikara Morizane, Fujinomiya (JP); Wataru Hirasawa, Fujinomiya (JP)

(73) Assignee: SUNSHO PHARMACEUTICAL CO., LTD., Fuji (JP)

( * ) Notice: Subject to any disclaimer, the term of this patent is extended or adjusted under 35 U.S.C. 154(b) by 492 days.

(21) Appl. No.: 17/044,599

(22) PCT Filed: Apr. 4, 2019

(86) PCT No.: PCT/JP2019/014955
§ 371 (c)(1),
(2) Date: Oct. 1, 2020

(87) PCT Pub. No.: WO2019/198612
PCT Pub. Date: Oct. 17, 2019

(65) Prior Publication Data
US 2021/0161820 A1     Jun. 3, 2021

(30) Foreign Application Priority Data

Apr. 12, 2018 (JP) .................... 2018-076957

(51) Int. Cl.
A61K 9/16 (2006.01)
(52) U.S. Cl.
CPC .......... *A61K 9/1652* (2013.01); *A61K 9/1611* (2013.01); *A61K 9/1641* (2013.01)
(58) Field of Classification Search
None
See application file for complete search history.

(56) References Cited

U.S. PATENT DOCUMENTS

| 4,892,740 A | 1/1990 | Takasima et al. |
| 5,498,447 A | 3/1996 | Nish et al. |
| 2009/0155359 A1* | 6/2009 | Nishito ............ A61P 29/00 424/464 |

FOREIGN PATENT DOCUMENTS

| EP | 1125576 | * | 8/2001 |
| JP | 63-188621 A | | 8/1988 |
| JP | 5-309314 A | | 11/1993 |
| JP | 7-25751 A | | 1/1995 |
| JP | 7-258072 A | | 10/1995 |
| JP | 2002-370968 A | | 12/2002 |
| JP | 2003-160474 A | | 6/2003 |
| JP | 2003-292437 A | | 10/2003 |
| JP | 2004-137272 A | | 5/2004 |
| JP | 2004-250367 A | | 9/2004 |
| JP | 2009-107944 A | | 5/2009 |
| JP | 4578124 B2 | | 11/2010 |
| JP | 2012-1460 A | | 1/2012 |
| JP | 2013-11026 A | | 1/2013 |
| JP | 2015-48315 A | | 3/2015 |
| JP | 2017-178830 A | | 10/2017 |
| WO | WO 2007/135470 A1 | | 11/2007 |
| WO | WO 2009/048073 A1 | | 4/2009 |

OTHER PUBLICATIONS

Ceolus, URL: (https://www.ceolus.com/ceolus_func.html), retrieved Jul. 13, 2020, 2 pages total.
International Search Report, issued in PCT/JP2019/014955, dated Jun. 18, 2019.
Japanese Office Action, issued in Application No. 2018-076957, dated Sep. 11, 2018.
Japanese Office Action, issued in Application No. 2019-071948, dated Mar. 31, 2020.
Offer of Information issued in Japanese Patent Application No. 2019-71948, dated Feb. 17, 2020.
Offer of Information issued in Japanese Patent Application No. 2019-71948, dated Jul. 20, 2020.
URL: (https://www.info.pmda.go.jp/go/pack/4223002D2083_1_07/), retrieved Jul. 7, 2020, 2 pages total.
URL: (https://www.info.pmda.go.jp/go/pack/6241013C2032_1_08/), retrieved Jul. 7, 2020, 2 pages total.
Written Opinion of the International Searching Authority, issued in PCT/JP2019/014955, dated Jun. 18, 2019.
Office Action issued Mar. 7, 2023, in Japanese Patent Application No. 2020-208264.
Web page of Sanwa Starch Co., Ltd. Feb. 22, 2023, retrieved from the Internet< <URL: https://www.sanwa-starch.co.jp/hyakka00/hyakka03/hyakka03_01/>.

* cited by examiner

*Primary Examiner* — Tigabu Kassa
(74) *Attorney, Agent, or Firm* — Birch, Stewart, Kolasch & Birch, LLP (57) ABSTRACT

Provided is a granulation composition that comprises core grains, coating grains and a binder for binding the core grains to each other and also binding the core grains to the coating grains to thereby maintain a granular shape, characterized in that: the coating grains adhere around a main granulation body comprising the core grains and the binder; the coating grains are insoluble in the binder; the core grains and/or the binder contain a medicinal ingredient or a biofunctional ingredient; and the developed interfacial area ratio Sdr is 100-700. According to this granulation composition, a uniform granulated product which is surface-coated with the coating grains and hardly segregated can be stably obtained, even if using a dilute solution with low gel strength as the binder. By setting the gelling agent concentration in the binder at a low level to give a dilute solution, therefore, the granulation composition having excellent properties can be produced at a high productivity.

15 Claims, 8 Drawing Sheets

EXAMPLES 1, 2 AND 5 (CORNSTARCH)

ASPECT RATIOS: 1.103, 1.040, 1.411 (AVERAGE, 1.18)

FIG.6

EXAMPLE 3 (ETHOCEL 100FP)

ASPECT RATIOS: 2.007, 1.311, 2.111 (AVERAGE, 1.81)

FIG.7

EXAMPLE 4 (TALC ML115)

ASPECT RATIOS: 1.249, 1.093, 1.548 (AVERAGE, 1.3)

FIG.8

EXAMPLE 6 (WOLLASTONITE KGP-H65)

ASPECT RATIOS: 16.7, 6.8, 18.0, 2.5, 8.8 (AVERAGE, 10.6)

FIG.9

COMPARATIVE EXAMPLE 1 (KC FLOCK W-200G)

ASPECT RATIOS: 18.26, 18.47, 4.895 (AVERAGE, 13.9)

GRANULATION COMPOSITION FORMED FROM CORE PARTICLES, COATING PARTICLES AND A BINDER

TECHNICAL FIELD

The present invention relates to a granulated composition in which the surfaces are covered with a particulate coating agent and are not smooth. More specifically, it relates to a granulated composition in which, even if the binder is a dilute solution having a low gel strength, good granulation into uniform particles is possible and which moreover is not prone to segregation or separation when mixed with a different type of powder or when stored and thus easily ensures content uniformity.

BACKGROUND ART

In the drug and food supplement fields, granules containing a pharmaceutically active ingredient or other biofunctional ingredient are produced by forming particles from a solution containing the pharmaceutically active ingredient or biofunctional ingredient and these granules are used in this form as a granular preparation, are filled into capsule shells to form capsules or are tableted to produce tablets.

JP-A 2004-250367 (Patent Document 1) describes, as a granulation method for obtaining such granules, a method in which a solution containing a pharmaceutically active ingredient or a biofunctional ingredient is delivered as drops onto a fluidized bed composed of a flowing coating agent and formed into particles covered with the coating agent which are then dried to give spherical coated particles.

When such coated particles are granulated, this is carried out, for example, as follows: a granulating solution is prepared by adding a pharmaceutically active ingredient or a biofunctional ingredient to a gelling agent solution (binder) composed of a polymeric substance that has a gelling action, such as gelatin, dissolved in water, and the granulating solution is delivered as droplets onto a fluidized bed of the coating agent, the coating agent particles are made to adhere to the droplets and the droplets are dried, thereby obtaining a granulated composition in which the surface is covered with coating agent particles.

If it is possible here to set the gelatin concentration of the gelling agent solution (binder) to a low level and thus form a dilute solution, even in cases where the sprayer or dispenser for delivering the granulating solution as droplets onto the fluidized bed lacks the pressure resistance and performance for spraying droplets of uniform size, the granulating solution can be successfully delivered as droplets and a granulated composition obtained. In addition, when the gelling agent solution (binder) is a dilute solution, the amount that can be delivered as droplets in a given period of time increases, which is also advantageous in terms of the productivity of the granulated composition. However, in cases where the concentration of gelling agent in the gelling agent solution (binder) is low and the gel strength is weak, and in cases where the binder inherently has no gel strength, the main granules to which the coating agent adheres are fragile and maintaining their shape is difficult. As a result, the main granules disintegrate and the desired granulated particles cannot be obtained; coarse granulated masses resulting from the agglomeration of just the coating agent end up forming instead.

Here, "to have a gelling action" refers to a polymer and the concentration thereof which is visually observed to exhibit no flowability when a solution of the polymer completely dissolved in a good solvent is left at rest for 10 minutes at room temperature and open to the atmosphere. "Gel strength" refers to the strength of this gelling action or to the degree of gelation. Specifically, when 20 g of a 20 wt % aqueous solution of, for example, pig or beef gelatin having a Bloom number of 200 or more is adjusted to 25° C. and left at rest for 10 minutes in a 100 mL beaker at room temperature and open to the atmosphere, because the aqueous solution of gelatin does not flow even if the beaker is tilted, it can be judged to have a gelling action. On the other hand, in the case of an ethanol solution containing 10 wt % of hydroxypropyl cellulose, when 20 g of this solution is adjusted to 25° C. and left at rest for 10 minutes in a 100 mL beaker at room temperature and open to the atmosphere, because the solution flows in a manner that follows movement of the container, it can be determined to not have a gelling action. Also, even with the above pig or beef gelatin having a Bloom number of 200 or more, at a concentration below 10 wt %, for example, the solution in the above-described method flows and does not gel, and so an aqueous solution of this gelatin concentration can be determined to be a polymeric substance solution having a concentration that is dilute to a degree that the solution cannot exhibit gel strength.

Granular particles are generally required to have a smooth spherical shape with few asperities and to have a particle size that matches that of other admixed particles. That is, in cases where granules are filled into a capsule shell and made into capsules or the granules are tableted to produce tablets, if these granules differ markedly in their powder properties from other excipients and the pharmaceutically active ingredient or biofunctional ingredient, uniform mixture becomes difficult and separation readily occurs. Such heterogeneity in powder mixing is called segregation. Examples of powder characteristics that tend to give rise to segregation include markedly differing particle sizes in the granules or powder being mixed, differing particle surface slip properties, differing specific gravities, markedly differing shapes and the like. When capsules or tablets are produced with the granules in a segregated state, the contents of the granules and the pharmaceutically active ingredient or biofunctional ingredient end up differing for each unit of the preparation and uniformity of the product quality is lost, resulting in a preparation which cannot provide equitable and uniform drug therapy or biofunction-enhancing effects. Hence, in order to avoid such segregation, other types of granules to be admixed are rendered into a smooth, spherical form with few asperities or the particle sizes are all set within a range of, for example, not more than 200 μm in diameter.

Accordingly, there exists a desire for a granulated composition in which are formed particle-like main granules that are able to maintain their shape well without disintegrating even when the binder is a dilute solution having a low gel strength and that do not readily segregate, enabling a granulated material composed of uniform particles to be effectively produced.

Prior art other than above Patent Document 1 includes Patent Documents 2 to 5 below.

PRIOR ART DOCUMENTS

Patent Documents

Patent Document 1: JP-A 2004-250367
Patent Document 2: JP-A 2002-370968
Patent Document 3: JP No. 4578124
Patent Document 4: JP-A 2017-178830

Patent Document 5: JP-A 2015-48315
Patent Document 6: JP-A S63-188621

SUMMARY OF INVENTION

Technical Problem

The present invention was arrived at in view of the above circumstances. The object of the invention is to provide a granulated composition in which are formed main granules that are able to maintain their shape well without disintegrating even when the binder is a dilute solution having a low gel strength and in which coating particles have been made to adhere to the periphery of the main granules, enabling a granulated material composed of uniform particles that do not readily segregate to be effective produced.

Solution to Problem

The inventors have conducted extensive investigations in order to achieve the above object. As a result, they have discovered that, when obtaining granules whose surfaces are covered with coating particles by delivering droplets of a granulating solution containing a binder and a pharmaceutically active ingredient or a biofunctional ingredient onto a fluidized bed of coating particles, by having core particles insoluble in the granulating solution present within the droplets, even in cases where the binder has a low gel strength, the droplets become main granules capable of maintaining a granular form in the fluidized bed and so good granules in which coating particles adhere to the periphery thereof can be obtained, thus incorporating the pharmaceutically active ingredient or biofunctional ingredient in the core particles and/or binder making up these main granules and enabling the desired granulated composition to be obtained. Moreover, to their surprise, the inventors also learned that, due to the adherence of the coating particles, asperities corresponding to the size of the coating particles are formed on the surface of the main granules, which discourages segregation. Upon conducting further investigations on the asperities that form on the particle surfaces, they found as well that it is preferable to set the developed interfacial area ratio Sdr of the granulated composition to from 100 to 700.

Accordingly, the present invention provides the following granulated composition.
1. A granulated composition that includes one or more core particle, a plurality of coating particles and a binder for binding the core particles to each other and the core particles with the coating particles so as to maintain a granular form, wherein the coating particles adhere to the periphery of a main granule consisting of the core particles and the binder, the coating particles are insoluble in the binder, the core particles or the binder or both contain a pharmaceutically active ingredient or a biofunctional ingredient, and the granulated composition has a developed interfacial area ratio Sdr of from 100 to 700.
2. The granulated composition of 1 above, wherein the coating particles have an aspect ratio of not more than 11.
3. The granulated composition of 1 or 2 above, wherein the binder is a polymeric substance solution or polymeric substance dispersion which has a gel strength that is weak to a degree that the binder cannot by itself maintain a granular form or has a concentration that is dilute to a degree that the binder cannot exhibit gel strength.
4. The granulated composition of any of 1 to 3 above, wherein the core particles contain a particulate pharmaceutically active ingredient or biofunctional ingredient.
5. The granulated composition of any of 1 to 3 above, wherein the pharmaceutically active ingredient or biofunctional ingredient is dissolved or dispersed in a hydrophobic liquid and droplets of the hydrophobic liquid are dispersed in the binder.
6. The granulated composition of 5 above, wherein the hydrophobic liquid is one or more selected from the group consisting of propylene glycol monocaprylate, propylene glycol dicaprylate, propylene glycol dicaprate, propylene glycol monolaurate, propylene glycol monooleate, benzyl benzoate, octyl decyl triglyceride, oleic acid, triethyl citrate, dimethyl polysiloxane, cinnamaldehyde, medium-chain mono/diglycerides, medium-chain fatty acid triglycerides, triacetin, piperonyl butoxide, diethyl phthalate, dibutyl phthalate, butyl phthalyl butyl glycolate, octyl dodecyl myristate and ethyl butyrate.
7. The granulated composition of any of 1 to 6 above, wherein particles which are the same as the coating particles are included as the core particles in the main granule.
8. The granulated composition of any of 1 to 4 above, wherein the main granule is formed of a binder obtained by dissolving a polymeric substance that lacks a gelling action in a solvent other than water and core particles containing particles of a pharmaceutically active ingredient or biofunctional ingredient that is insoluble in the solvent.
9. The granulated composition of any of 1 to 8 above, wherein the coating particles are one or more powder selected from the group consisting of ethyl cellulose, cornstarch, rice starch, wheat starch, potato starch, calcium stearate, magnesium carbonate, low degree of substitution carboxymethyl starch sodium, sodium starch glycolate, silicic anhydride, magnesium silicate, diatomaceous earth, bentonite, zeolite, silicon dioxide, agar-agar powder, croscarmellose sodium, crospovidone and talc.
10. The granulated composition of any of 1 to 9 above, wherein the binder is obtained by dissolving or dispersing in a solvent one or more polymeric substance selected from the group consisting of gelatin, carrageenan, agar-agar, polyethylene glycol, methyl cellulose, hydroxypropyl methylcellulose, hydroxypropyl cellulose, methacrylic acid copolymers, aminoalkyl methacrylate copolymers, aminoalkyl methacrylate copolymers, ethyl acrylate-methyl methacrylate copolymers, hypromellose phthalate, hypromellose acetate succinate, cellulose acetate phthalate and polyvinyl acetate phthalate.

Advantageous Effects of Invention

The granulated composition of the invention enables uniform granules to be obtained which are covered on surfaces thereof with coating particles and which do not readily segregate even when the binder is a dilute solution having a low gel strength. By setting the binder to a low gelling agent concentration and thus making the solution dilute, there is no need for an excessive level of performance in the sprayer or disperser used to deliver the granulating solution as droplets onto the fluidized bed, thus making it possible to achieve an improved productivity.

DESCRIPTION OF EMBODIMENTS

The invention is described more fully below.

The granulated composition of the invention, as noted above, has a morphology in which a plurality of coating particles adhere to the periphery of a main granule consisting of one or more core particle and a binder and which has asperities corresponding to the shapes of the coating particles. A pharmaceutically active ingredient or biofunctional ingredient is contained in the core particles and/or binder which form the main granule.

The pharmaceutically active ingredient or biofunctional ingredient is not particularly limited, so long as it is an ingredient that can disperse or dissolve in the subsequently described binder. Illustrative examples of pharmaceutically active ingredients include chlorpromazine, thioridazine, olanzapine, quetiapine, risperidone, haloperidol, perphenazine, aripiprazole, paliperidone, amoxapine, fluoxetine, fluvoxamine, paroxetine, sertraline, trazodone, nefazodone, clomipramine, desipramin, nortriptyline, levodopa, donepezil, bromocriptine, pergolide, pramipexole, ropinirole, methylphenidate, atomoxetine, pregabalin, lacosamide, carbamazepine, clonazepam, levetiracetam, oxcarbazepine, phenobarbital, phenytoin, topiramate, valproic acid, divalproex sodium, zonisamide, alprazolam, lorazepam, oxazepam, clorazepate, diazepam, halazepam, zolpidem, phenobarbital, ethclorvynol, glutethimide, pentobarbital, sildenafil, tadalafil, cyclosporine, mycophenolate mofetil, sirolimus, tacrolimus, terazosin hydrochloride, benazepril, captopril, clonidine hydrochloride, enalapril, hydralazine hydrochloride, losartan potassium, methyldopate hydrochloride, minoxidil, moexipril, candesartan, irbesartan, losartan, telmisartan, valsartan, guanabenz acetate, guanadrel sulfate, guanfacine hydrochloride, reserpine, atenolol, betaxolol, bisoprolol, carteolol, carvedilol, labetalol, metoprolol, pindolol, propranolol, sotalol, timolol, amlodipine, diltiazem, nicardipine, nifedipine, nisoldipine, verapamil, fenofibrate, atorvastatin, fluvastatin, lovastatin, pravastatin, simvastatin, mosapride, itopride, domperidone, trimebutine, metoclopramide, bisacodyl, diphenoxylate hydrochloride, loperamide, clopidogrel bisulfate, phytonadione, ticlopidine, warfarin sodium, limaprost, beraprost, almotriptan, ergotamine, frovatriptan, methylsergide, sumatriptan, zolmitriptan, azathioprine, hydroxychloroquine, leflunomide, methotrexate, penicillamine, sulfasalazine, acetoaminophen, aspirin, diclofenac, fenoprofen, ibuprofen, ketoprofen, naproxen, indomethacin, meloxicam, piroxicam, celecoxib, rofecoxib, codeine, fentanyl, hydrocodone, hydromorphone, levorphanol, meperidine, morphine, oxycodone, pentazocine, propoxyphene, tramadol, tapentadol, imatinib, erlotinib, sunitinib, sorafenib, lapatinib, gefitinib, dasatinib, lenalidomide, clofazimine, cycloserine, ethionamide, rifabutin, albendazole, ivermectin, mebendazole, praziquantel, valaciclovir, valganciclovir, indinavir, lamivudine, nelfinavir mesylate, nevirapine, ritonavir, oseltamivir, amoxicillin, amoxicillin cefuroxime sodium, cefuroxime acetyl, penicillin, cefixime, erythromycin, ciprofloxacin, methotrexate, mercatopurine, digoxin, disopyramide, flecainide acetate, mexiletine hydrochloride, moricizine hydrochloride, procainamide hydrochloride, propafenone hydrochloride, quinidine, sotalol hydrochloride, tocainide, lansoprazole, omeprazole, pantoprazole, rabeprazole, sucralfate, acarbose, metformin, nateglinide, repaglinide, acetohexamide, chlorpropamide, tolazamide, tolbutamide, glimepiride, glipizide, glyburide, pioglitazone, rosiglitazone, amiloride hydrochloride, bumetanide, etacrynic acid, furosemide, torsemide, hydrochlorothiazide, chlorthalidone, indapamide, metolazone, polythiazide, quinethazone, trichlormethiazide, spironolactone, triamterene, allopurinol, colchicine, probenecid, sulfinpyrazone, albuterol sulfate, montelukast sodium, theophylline, zileuton, azatadine, chlorpheniramine maleate, diphenhydramine hydrochloride, clemastine, fexofenadine, hydroxyzine, loratadine, desloratadine, and pharmacologically acceptable salts of these.

A "biofunctional ingredient" is an ingredient which is absorbed by the body and has a given action on the body, and which can be used in functional foods such as supplements. Illustrative examples include coenzyme Q10, lutein, curcuminoids, silymarin, astaxanthin, zeaxanthin, cryptoxanthin, fucoxanthin, lycopene, sesamin, α-lipoic acid, fat-soluble vitamins (vitamin A, vitamin D, vitamin E, vitamin K) and derivatives thereof, docosahexaenoic acid (DHA), eicosapentaenoic acid (EPA), saw palmetto extract (oleic acid, lauric acid, myristic acid, linoleic acid, palmitic acid), St. Johns wort (hypericin), royal jelly (decenoic acid), hesperidin, nobiletin, quercetin, kaempferol, myricitrin, catechins, daidzein, glycitein, genistein, myricetin, stilbene and available derivatives of these.

The pharmaceutically active ingredient or biofunctional ingredient is not limited to these. Any pharmaceutically active ingredient or biofunctional ingredient may be used so long as it is one that is capable of being employed in the granulated composition of the invention.

The coating particles should be particles which are acceptable to the body, especially ones which are pharmacologically or food hygienically allowable, and which moreover are insoluble in the binder. Use can be made of particles commonly known as coating particles for pharmaceuticals and functional foods. Examples include ethyl cellulose, cornstarch, rice starch, wheat starch, potato starch, calcium stearate, magnesium carbonate, low degree of substitution carboxymethyl starch sodium, sodium starch glycolate, silicic anhydride, magnesium silicate, diatomaceous earth, bentonite, zeolite, silicon dioxide, agar-agar powder, croscarmellose sodium, crospovidone and talc. These may be used singly or two or more may be used in admixture.

These coating particles have a particle size which is not particularly limited, although it is preferable for $d_{50}$ to be from 5 to 70 μm, and more preferable for $d_{50}$ to be from 10 to 30 μm. If the particle size is too large, adhesion to the main granule is poor and the water absorbency may be insufficient. On the other hand, if the particle size is too small, the particles have a tendency to scatter when a fluidized bed is formed in the granulation operation. The particle size of these coating particles sometimes affects the subsequently described Sdr value as well, a fact which should be taken into account so as to ensure that the Sdr value falls in the range of the invention. In addition, although not particularly limited, it is preferable for these coating particles to have an angle of repose of not more than 60°, especially not more than 50°. The flowability of the granulated composition thus obtained is enhanced, making it possible to improve the workability and productivity in subsequent steps, such as when tableting the granulated composition.

Also, these coating particles, although not particularly limited, have an aspect ratio of preferably not more than 11, especially not more than 4. When the aspect ratio of the coating particles exceeds 11, the subsequently described Sdr value becomes larger and the variability in the Sdr values of the resulting granulated composition tends to be large, as a result of which it may not be possible to stably achieve the Sdr value of the invention. This will be described later. The aspect ratio can be measured by, very simply, uniformly suspending the coating particles in an inert fluid such as silicone oil, placing the dispersion between slide glasses, taking an image of the dispersion with a microscope, and determining the length/width ratios in the microscopic image of particles that have been randomly selected from the image.

The binder should be a substance that is pharmacologically or food hygienically allowable and that binds the core particles to each other and the core particles with the coating particles so as to maintain a granular form. Use can be made of a commonly known binder that is used in granulating operations. Specific examples include gelatin, carrageenan, methyl cellulose, hydroxypropyl methylcellulose, hydroxypropyl cellulose, methacrylic acid copolymers, hypromellose phthalate, hypromellose acetate succinate, cellulose acetate phthalate and polyvinyl acetate phthalate. One or more of these polymeric substances dissolved in a solvent such as water or ethanol may be used as the binder. Examples of solvents other than water include, in addition to ethanol: acetic acid, acetone, t-butyl methyl ether, ethyl acetate, 2-propanol, methanol, ammonia, hexane, pyridine and dichloromethane.

Next, the core particles, together with the binder, form a main granule, becoming the nucleus of the main granule. Owing to the presence of these core particles, even when the binder is a dilute solution or dispersion having a weak gel strength, the form of the main granule can be well maintained. If the pharmaceutically active ingredient and/or biofunctional ingredient can exist in the form of particles within the binder, they may serve as the core particles. Alternatively, core particles may be included separately from the pharmaceutically active ingredient and the biofunctional ingredient, in which case the core particles should be made of a material which is pharmacologically or food hygienically allowable. Examples include the same as those mentioned above in connection with the coating particles.

Figure 1:
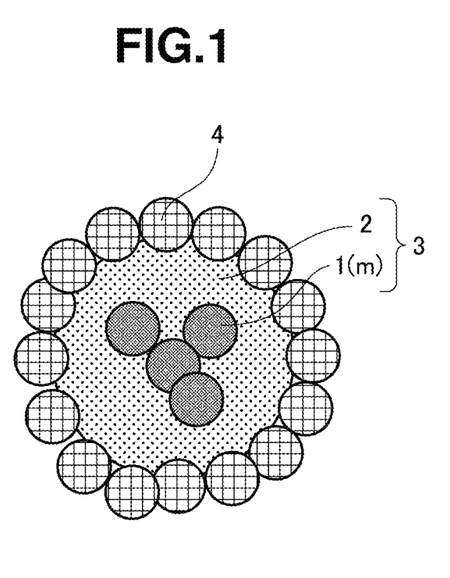
FIG. 1 is a schematic diagram showing an embodiment of the granulated composition according to the present invention.
Figure 2:
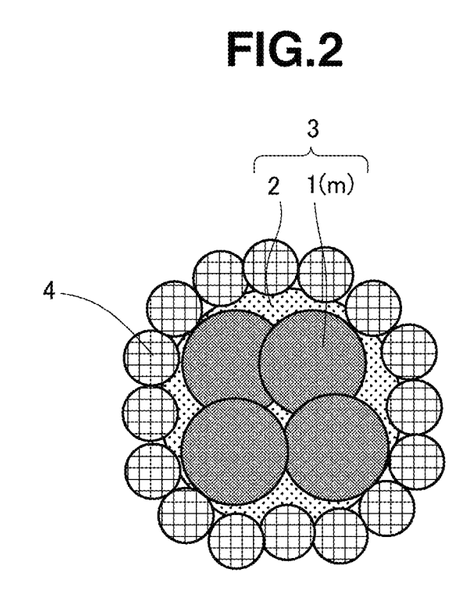
FIG. 2 is a schematic diagram showing another embodiment of the granulated composition according to the invention.

As noted above, the granulated composition of the invention includes a pharmaceutically active ingredient or a biofunctional ingredient in the core particles and/or binder that form the main granule. The morphology includes primarily the three types of morphology shown in FIGS. 1 to 3. That is, FIGS. 1 and 2 show morphologies in which a particulate pharmaceutically active ingredient m serves as the core particles 1, and a main granule 3 formed of these and a binder 2 has coating particles 4 adhering to the periphery thereof. The morphology in FIG. 1 uses a binder obtained by dissolving a polymeric substance having a gelling action, such as gelatin, in a solvent such as water; a main granule 3 in which one, two or more (in FIG. 1, four) core particles 1 (pharmaceutically active ingredient m) are present at the center portion of a binder 2 maintained in a granular shape has a plurality of the coating particles 4 adhering to the periphery thereof. The morphology in FIG. 2 uses a binder 2 obtained by dissolving a polymeric substance that does not have a gelling action, such as hydroxypropyl methylcellulose (HPMC) in a solvent other than water, such as ethanol; in this case, although the binder 2 is not maintained in a granular form, the core particles 1 (pharmaceutically active ingredient m) bind to each other by means of the binder 2 so that a main granule 3 is formed of the binder 2 and the core particles 1 (pharmaceutically active ingredient m), and a plurality of coating particles 4 adhere to the periphery of this main granule 3.

Figure 3:
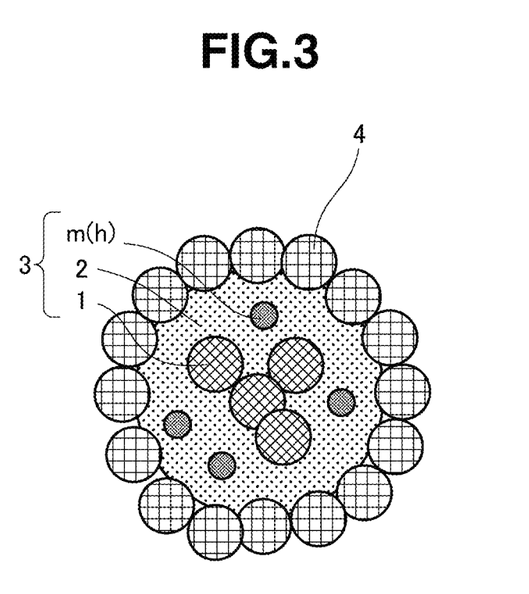
FIG. 3 is a schematic diagram showing yet another embodiment of the granulated composition according to the invention.

The morphology in FIG. 3 uses a binder 2 obtained by dissolving a polymeric substance having a gelling action, such as gelatin, in a solvent such as water; along with forming a main granule 3 using cornstarch or the like as the core particles 1, a pharmaceutically active ingredient m is included within the binder 2 that forms this main granule 3. In this case, the pharmaceutically active ingredient m may be present in a dispersed state within the binder 2 as shown in FIG. 3, or may be present in a dissolved state in the binder 2.

Moreover, in the FIG. 3 morphology, the pharmaceutically active ingredient or biofunctional ingredient may be dispersed or dissolved within droplets of a hydrophobic liquid, and the droplets h of this hydrophobic liquid may be placed in a dispersed state within the binder 2. In this case, illustrative examples of the hydrophobic liquid include propylene glycol monocaprylate, propylene glycol dicaprylate, propylene glycol dicaprate, propylene glycol monolaurate, propylene glycol monooleate, benzyl benzoate, octyl decyl triglyceride, oleic acid, triethyl citrate, diethyl polysiloxane, cinnamaldehyde, medium-chain mono/diglycerides, medium-chain fatty acid triglycerides, triacetin, piperonyl butoxide, dimethyl phthalate, dibutyl phthalate, butyl phthalyl butyl glycolate, octyl dodecyl myristate and ethyl butyrate. One, two or more of these may be suitably used.

The granulated composition of the invention is one in which, as shown in FIGS. 1 to 3, the coating particles 4 adhere densely to the periphery of a main granule 3. In this case, as explained above, the coating particles 4 are insoluble in the binder, and so they adhere directly as particles to the main granule 3 without dissolution of the particle surfaces. A distinct interface thus exists between the main granule 3 and the coating particles 4. Also, the coating particles 4 closely cover the surface of the main granule 3 without overlapping, and the width and depth of gaps between coating particles depend on the shape and size of the coating particles. That is, the surface roughness of the granulated composition of the invention is determined by the shape and size of the coating particles. Methods for evaluating the waviness, roughness and small asperities in the surface of an object are set forth in the following international standard: ISO 25178 Surface Properties (Surface Roughness Measurement). Of these, the "developed interfacial area ratio Sdr" refers to a numerical value, expressed as a percentage, indicating the degree to which the surface area when asperities observed in a specific region (e.g., 50 µm square) are spread out and smoothly developed increases compared with a completely smooth surface when no asperities whatsoever are present in the same region. The developed interfacial area ratio Sdr can be measured by using a white light interference microscope and obtaining three-dimensional information on waviness, roughness and small asperities in the surface of an object from an interference pattern generated by moving the lens in the Z direction while shining a white light at the surface of the object.

Here, in cases where the surface roughness of the granules exerts an influence on surface slip characteristics and ease of entanglement, giving rise in turn to segregation, a correlation is observable between the degree of segregation and the developed interfacial area ratio Sdr. Moreover, because the surface roughness of the granules is determined by the shape and size of the coating particles, segregation of the granules can be more reliably prevented by selecting, in the granulated composition of the invention, suitable coating particles and a suitable developed interfacial area ratio Sdr.

Accordingly, in the granulated composition of the invention, this developed interfacial area ratio Sdr is set to from 100 to 700, and preferably from 150 to 400. If the Sdr is too large, when the main granules are mixed together with other excipients and the pharmaceutically active ingredient or biofunctional ingredient, the integrity and entangleability between granules may be too strong, giving rise to segregation. On the other hand, if the Sdr is too small, the granules mutually slip to such a degree that a uniform dispersed state cannot be maintained in the mixing operation and ultimately tend to segregate.

As mentioned above, the developed interfacial area ratio Sdr in the granulated composition of the invention is strongly influenced by the size and shape of the coating particles; by adjusting the size and shape of the coating particles, the above Sdr value can be stably achieved. Specifically, it becomes easier to stably achieve the above Sdr value by adjusting the diameter and aspect ratio of the coating particles within the above-mentioned ranges. Along with the size of the coating particles, the shape also strongly influences the Sdr value. For instance, as in the subsequently described Comparative Example 1, when prismoidal to acicular coating particles having aspect ratios that exceed the preferred range mentioned above are used, not only does the Sdr value of the resulting granulated particles become large, the variability of the Sdr value also becomes very large, and so stably achieving this Sdr value tends to be difficult. In the granulated composition of the present invention, the size (diameter) and shape (aspect ratio) of the coating particles are not limited so long as a developed interfacial area ratio Sdr in the above range is achieved.

In order to obtain the granulated composition of the invention having such a morphology, preferred use can be made of a method of granulation that involves preparing a granulating solution by dissolving or dispersing the binder and the pharmaceutically active ingredient or biofunctional ingredient (these being optionally in a hydrophobic liquid-dispersed or dissolved state) in water or another solvent, and also, where necessary, separately adding the above core particles; and then delivering this granulating solution as droplets onto a fluidized bed of the coating particles so as to cause the coating particles to adhere to the surface of the droplets and water or the other solvent to be absorbed by the coating particles, thereby forming granules.

In this case, the granulated composition of this invention makes it possible, when preparing the granulating solution, to set the polymeric substance making up the binder to a low concentration. Moreover, even with such a granulating solution in which the gelling agent (polymeric substance) concentration is dilute and the gelling strength is low, owing to the presence of the core particles, the liquid droplets become, in the fluidized bed, main granules which are able to maintain a granular form, enabling good granules in which the coating particles adhere to the periphery of the main granules to be obtained.

The granulated composition of the invention may suitably include known additives within ranges that do not detract from the objects of the invention. For example, sweeteners, colorants, preservatives, thickeners, stabilizers, antioxidants, flavors, acidulants, seasonings and pH adjustors may be included within the main granules.

EXAMPLES

The invention is illustrated more fully below by way of Examples, although the invention is not limited by these Examples. For each of the following used as coating particles: cornstarch in Examples 1, 2 and 5, ethyl cellulose (product name, Ethocel 100 FP) in Example 3, talc (product name, Talc ML115) in Example 4, wollastonite (product name, KGP-H65) in Example 6 and crystalline cellulose (product name, KC Flock W-200G) in Comparative Example 1, the particle shapes were confirmed in an image of the particles taken with a microscope, the aspect ratios in the image of from three to five particles randomly selected in the image were measured, and the average of these was treated as the aspect ratio for the coating particles. The micrographs used at this time are shown in FIGS. 5 to 9.

Example 1

Ten milligrams of butyl p-hydroxybenzoate was added to 40 g of purified water, and the butyl p-hydroxybenzoate was dissolved by heating on a 95° C. water bath. After cooling to room temperature, 5 g of gelatin was added and the system was heated to 55 to 65° C., giving an aqueous solution of gelatin (binder).

While stirring the aqueous gelatin solution at between 55 and 65° C., 5 g of the pharmaceutically active ingredient methotrexate (particle size, $d_{50}$=22 µm) was added and mixed in, giving a granulating solution. This granulating solution was a uniform dispersion of methotrexate in an aqueous gelatin solution in which butyl p-hydroxybenzoate was completely dissolved.

Next, 45.0 g of this granulating solution was charged into a metered liquid dispenser having a 0.3 mm dispensing nozzle diameter, and the discharging pressure was set to 0.5 MPa and the intermittent discharge rate was set to 10,000 rpm. An open pan-type granulator (pan diameter, 300 mm) was installed 70 cm below the dispensing nozzle, 500 g of Japanese Pharmacopoeia grade cornstarch ($d_{50}$=21 µm; particle shape, approximately spherical; aspect ratio, 1.18) was placed in the pan as the coating agent (coating particles), and the pan was orbitally shaken at 90 rpm, causing the cornstarch powder to tumble and fluidize and thereby forming a fluidized bed. The granulating solution was discharged in this state from a metered liquid dispenser toward the fluidized bed of cornstarch powder under the above conditions, throwing droplets of the granulating solution into the fluidized bed of coating particles made of the cornstarch powder.

After the 45.0 g of the granulating solution was dispensed, the cornstarch powder serving as the coating agent was recovered and applied to a sieve with 91 μm openings, and 49.7 g of the granulated particles and 492 g of the ungranulated cornstarch were classified. These granulated particles, as in the schematic diagram in FIG. 1, had a morphology in which a main granule 3 composed of a plurality of methotrexate crystal core particles 1 (m) contained at the center of a particle of the binder 2 was coated on the outside with cornstarch as the coating particles 4. The moisture content of these granulated particles, as determined by the loss on drying test method, was 11.3%. The butyl p-hydroxybenzoate content in the granulated particles was 191 μg/g. Hence, it was assumed that cornstarch holding up to about 11% of moisture absorbed from the discharged droplets of granulating solution adhered as coating particles to the dispensed droplets of the granulating solution that had dried from a moisture content of about 80% to about 11% in the cornstarch, and that the granulated particles were composed of these in a weight ratio of approximately 1:4.

The particle size distribution of the resulting granulated particles was measured with a laser diffraction/scattering type particle size analyzer, whereupon the average particle sizes were as follows: $d_{50}$=343 μm, $d_{10}$=190 μm, $d_{90}$=452 μm, indicating a high particle size uniformity. Thus, even when the gelatin concentration of the binder was dilute and the gel strength was low, by having particles of the pharmaceutically active ingredient serve as the core particles, a granulated composition of uniform particles can be obtained.

The developed interfacial area ratio Sdr of the resulting granulated particles was measured by the following method, whereupon the first measurement was 350 and the second measurement was 322, for an average value of 336.

[Method of Measuring Developed Interfacial Area Ratio Sdr]

The Sdr was determined by using a white light interference microscope (Contour GT-K, from Bruker Nano Inc.) to examine a specimen prepared by attaching particles to a double-sided tape and carrying out platinum vapor deposition, performing measurements on each of two randomly selected particles, and carrying out Static Filter processing (Type=Median, size=6) and Mask Data processing (0.05 mm×0.05 mm) using the Vision64 (version 5.41) analysis software.

Example 2

An aqueous gelatin solution (binder) was obtained by adding 4 g of gelatin to 35 g of purified water and heating at between 55 and 65° C. Separately, 1 g of cyclosporine (pharmaceutically active ingredient) and 10 mg of butyl p-hydroxybenzoate were added to 3 g of triethyl citrate, and the cyclosporine and butyl p-hydroxybenzoate were dissolved by heating at between 55 and 65° C., giving a pharmaceutically active ingredient solution.

While stirring the aqueous gelatin solution at between 55 and 65° C., the pharmaceutically active ingredient solution was gradually added and mixed in, after which 4 g of cornstarch (particle size, $d_{50}$=21 μm; shape, approximately spherical; aspect ratio, 1.18) was gradually added and uniformly mixed in, giving a granulating solution. Because this granulating solution had a gelatin concentration of at most 8.5%, it was a solution dilute to a degree as to be unable to exhibit gel strength. It contained, uniformly dispersed in the aqueous gelatin solution (binder), droplets of triethyl citrate in which cyclosporine and butyl p-hydroxybenzoate are completely dissolved and particles of cornstarch (core particles).

Figure 4:
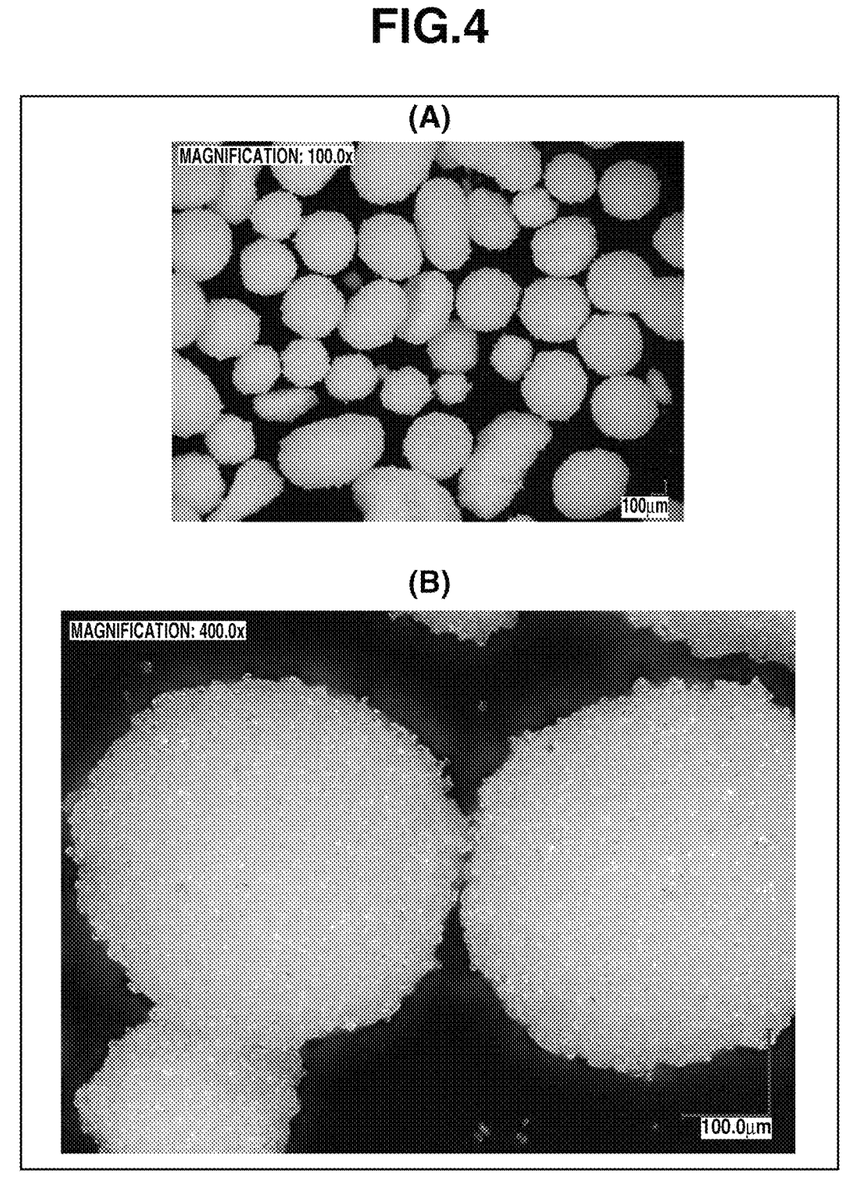
FIG. 4 shows the appearance of the granulated composition obtained in Example 2, (A) being a photograph taken at a magnification of 100× and (B) being a photograph taken at a magnification of 400×.
Figure 5:
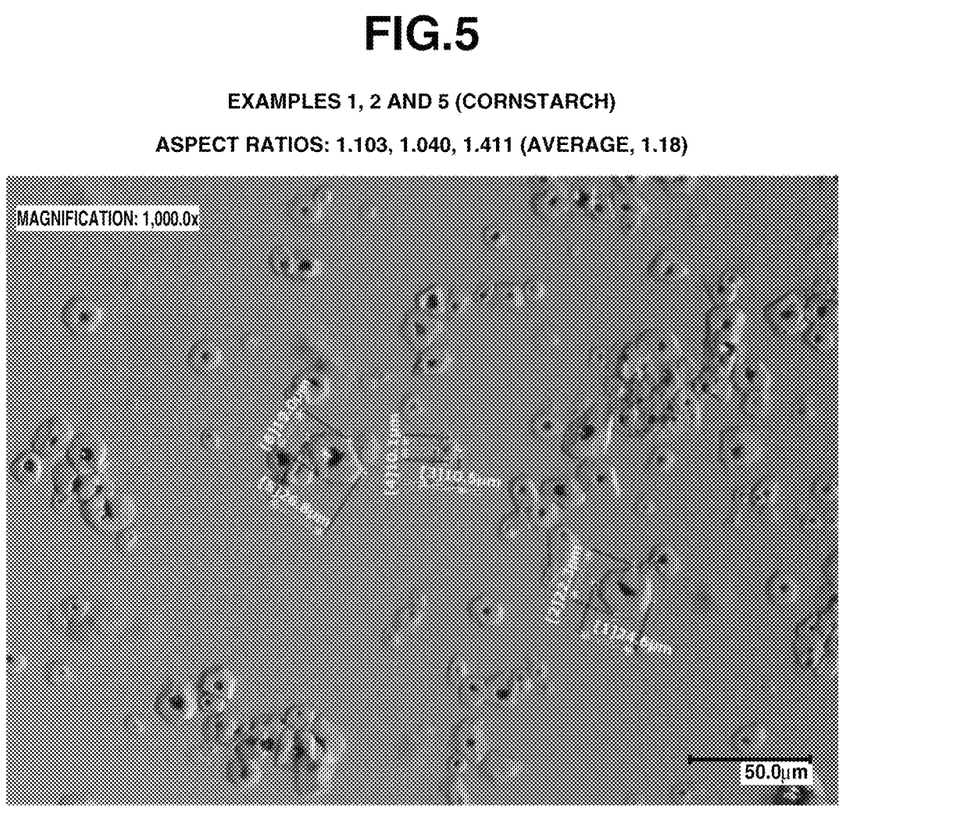
FIG. 5 is a micrograph showing the cornstarch used as the coating particles in Examples 1, 2 and 5; the aspect ratio of this cornstarch was determined based on the micrograph.
Figure 6:
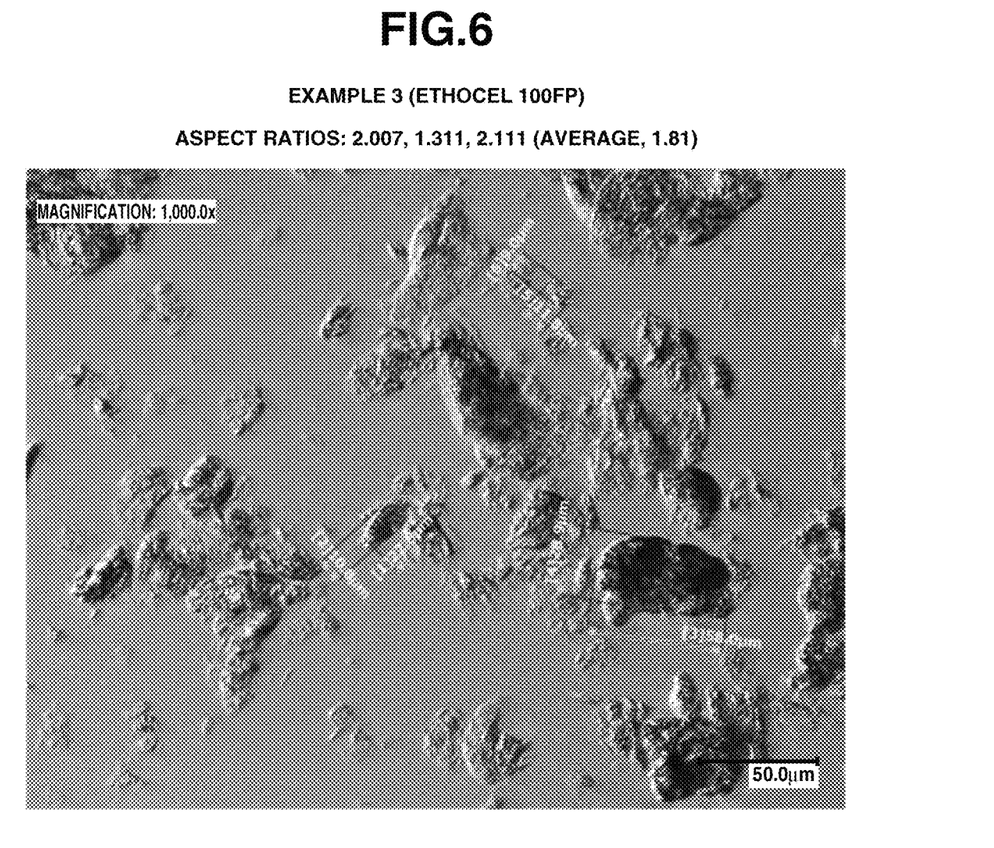
FIG. 6 is a micrograph showing the ethyl cellulose (product name: Ethocel 100FP) used as the coating particles in Example 3; the aspect ratio of this ethyl cellulose was determined based on the micrograph.
Figure 7:
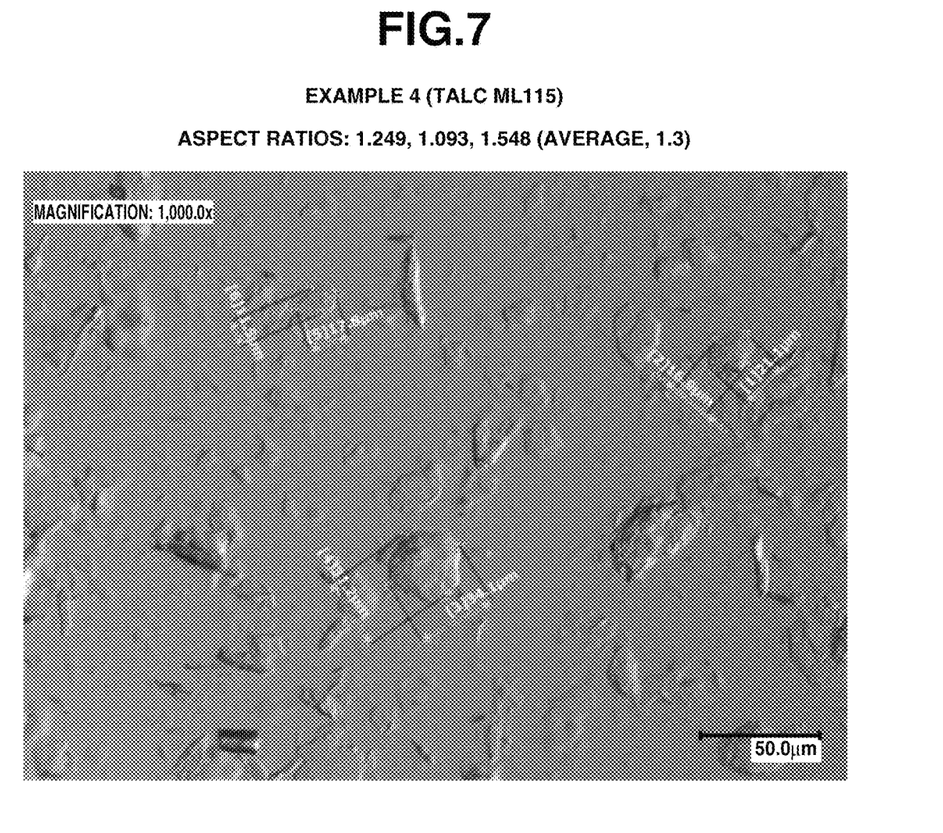
FIG. 7 is a micrograph showing the talc (product name: Talc ML115) used as the coating particles in Example 4; the aspect ratio of this talc was determined based on the micrograph.
Figure 8:
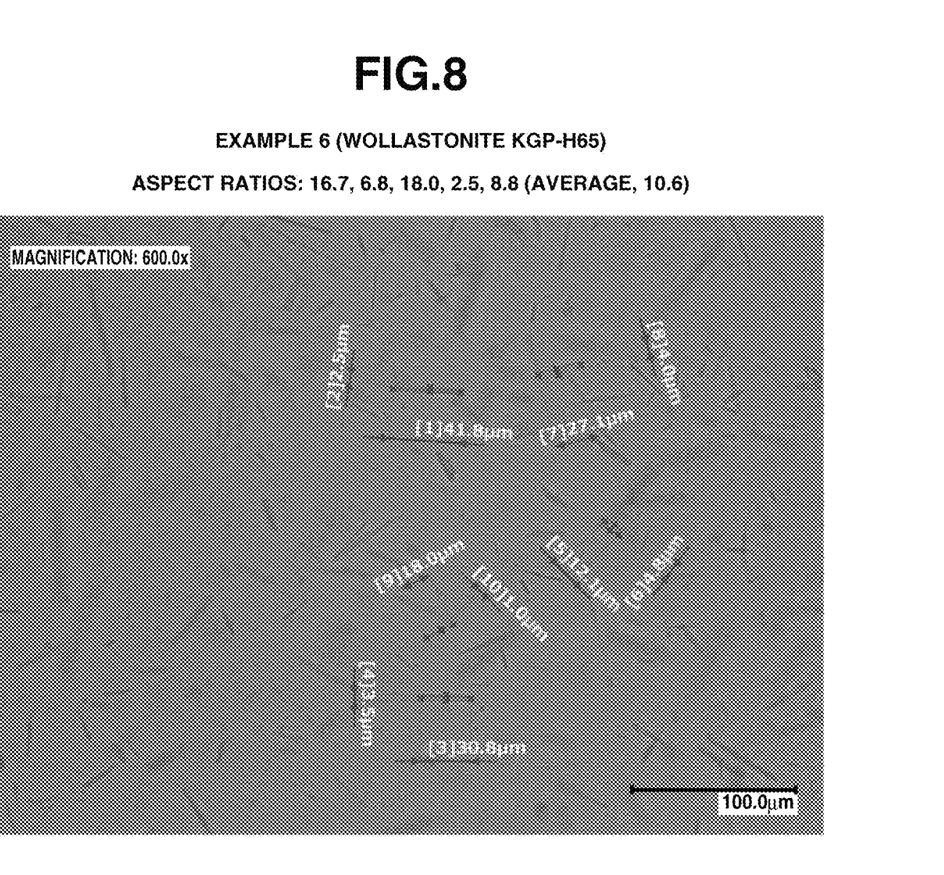
FIG. 8 is a micrograph showing the wollastonite (product name: KGP-H65) used as the coating particles in Example 6; the aspect ratio of this wollastonite was determined based on the micrograph.
Figure 9:
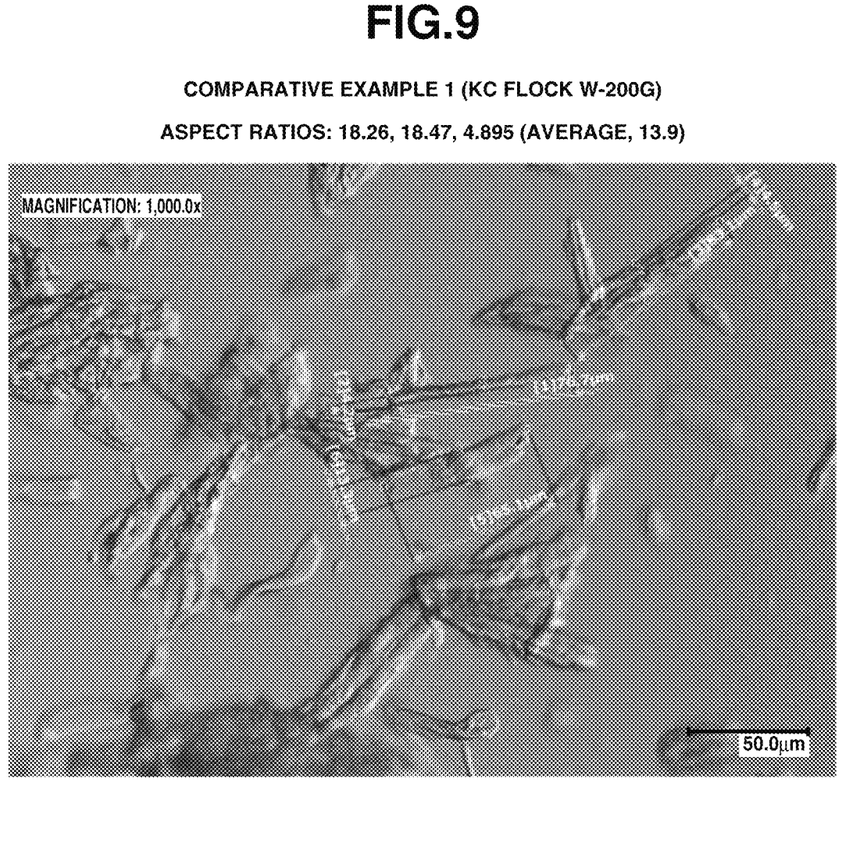
FIG. 9 is a micrograph showing the crystalline cellulose (product name: KC Flock W-200G) used as the coating particles in Comparative Example 1; the aspect ratio of this crystalline cellulose was determined based on the micrograph.

Next, 45.0 g of this granulating solution was dispensed onto a fluidized bed of cornstarch powder using the same granulating apparatus and method as in Example 1, applied to a sieve with 91 μm openings, and 44.1 g of the granulated particles and 501 g of the ungranulated cornstarch were classified. These granulated particles, as in the schematic diagram in FIG. 3, had a morphology in which a main granule 3 consisting of cornstarch as the core particles 1 and, as the binder 2, the dried aqueous gelatin solution in which were dispersed droplets h of triethyl citrate containing cyclosporine (pharmaceutically active ingredient) m was coated on the surface with cornstarch (coating particles) 4. Photographs of the appearance of the granulated particle are shown in FIG. 4. These granulated particles, as in Example 1, are assumed to be composed of dried granulating solution and cornstarch that has absorbed water, in a weight ratio therebetween of approximately 1:4.

As in Example 1, the particle size distribution of the resulting granulated particles was measured with a laser diffraction/scattering type particle size analyzer, whereupon the average particle sizes were as follows: $d_{50}$=299 μm, $d_{10}$=159 μm, $d_{90}$=379 μm, indicating a high particle size uniformity. Thus, even when the gelatin concentration of the binder was dilute and the gel strength was low, by having particles of cornstarch serve as the core particles and including the pharmaceutically active ingredient in the binder, a granulated composition of uniform particles can be obtained.

Reference Example

Aside from not including triethyl citrate and cyclosporine, and reducing the content of cornstarch as core particles to 1 g, a granulating solution was prepared in the same way as in Example 2. Using this granulating solution, granulated particles were obtained in the same way as in Example 2 and the particle size distribution was similarly measured, whereupon the average particle sizes were as follows: $d_{50}$=269 μm, $d_{10}$=140 μm, $d_{90}$=435 μm, indicating a high particle size uniformity. Thus, it was confirmed that even when the amount of core particles is low and they are made of the same material as the coating particles, uniform granulated particles can be obtained.

Example 3

Aside from lowering the amounts of gelatin and methotrexate used to 2.5 g each and adding 2.5 g of ethyl cellulose (Nissin Kasei Co., Ltd.; product name, Ethocel 100FP; $d_{50}$=19 μm; shape, flaky; aspect ratio, 1.81) as the core particles to the granulating solution, a granulating solution was obtained in the same way as in Example 1. Also, aside from using the same ethyl cellulose as that making up the core particles in the fluidized bed as well, granulated particles were produced in the same way as in Example 1. The particle size distribution of these granulated particles was measured, whereupon the average particle sizes were as follows: $d_{50}$=230 μm; $d_{10}$=166 μm; $d_{90}$=294 μm, indicating a high particle size uniformity. The developed interfacial area ratio Sdr of the resulting granulated particles was measured in the same way as in Example 1, whereupon the first measurement was 268 and the second measurement was 328, for an average value of 298.

Example 4

Aside from adding 2.5 g of talc (Fuji Talc Industrial Co., Ltd.; product name, Talc ML115; $d_{50}$=6.3 µm; shape, approximately spherical to flaky; aspect ratio, 1.3) as the core particles to the granulating solution, a granulating solution was obtained in the same way as in Example 3. Also, aside from using the same talc as that making up the core particles in the fluidized bed as well, granulated particles were produced in the same way as in Example 3. The particle size distribution of these granulated particles was measured, whereupon the average particle sizes were as follows: $d_{50}$=248 µm; $d_{10}$=202 µm; $d_{90}$=300 µm, indicating a high particle size uniformity. The developed interfacial area ratio Sdr of the resulting granulated particles was measured in the same way as in Example 1, whereupon the first measurement was 186 and the second measurement was 240, for an average value of 213.

Comparative Example 1

Aside from using crystalline cellulose (Nippon Paper Industries Co., Ltd.; product name, KC Flock W-200G; $d_{50}$=13 µm; shape, prismoidal to acicular; aspect ratio, 13.9) in the fluidized bed, granulated particles were obtained in the way as in Example 1. The particle size distribution was measured, whereupon the average particle sizes were as follows: $d_{50}$=159 µm; $d_{10}$=88 µm; $d_{90}$=296 µm, indicating a high particle size uniformity. The developed interfacial area ratio Sdr of the resulting granulated particles was measured in the same way as in Example 1, whereupon the first measurement was 757 and the second measurement was 3,500, for an average value of 2,129.

Comparative Example 2

Aside from not adding cornstarch as the core particles to the granulating solution, a granulating solution was obtained in the same way as in Example 2. Because this granulating solution had a gelatin concentration of 9.3%, it was a solution dilute to a degree as to be unable to exhibit gel strength. Next, 40 g of this granulating solution was dispensed onto a fluidized bed of cornstarch powder in the same way as in Example 2, whereupon the cornstarch powder in the fluidized bed began to mutually bond, forming countless masses of various shapes about 1 cm in size. It was conjectured here that because the dispensed droplets did not have a substantial particle strength, they assumed irregular shapes, merely wetted the cornstarch powder of the fluidized bed and bonded to each other.

Hence, it became apparent that, in order to obtain the granulated composition of the invention, it is necessary for the dispensed droplets to have a substantial particle strength and become main granules capable of maintaining a granular form and for an insoluble powder that does not dissolve in the binder (in this Example, an aqueous gelatin solution) to be made to adhere to the periphery as coating particles, and also that when dispensing as droplets a polymer solution that is dilute to a degree that exhibiting a substantial particle strength is difficult, it is essential for insoluble particles to be made present as core particles within the droplets.

Example 5

Four grams of hydroxypropyl cellulose (HPC) and 0.01 g of butyl p-hydroxybenzoate were added to and dissolved in 40 g of ethanol, giving an HPC ethanol solution (binder). Four grams of methotrexate (particle size, $d_{50}$=22 µm) was added as a pharmaceutically active ingredient to and mixed in this HPC ethanol solution, thereby giving a granulating solution. This granulating solution consisted of particles of the pharmaceutically active ingredient methotrexate uniformly dispersed in a HPC ethanol solution within which butyl p-hydroxybenzoate and HPC were completely dissolved.

Using this granulating solution, granulated particles were obtained in the same way as in Example 1. The resulting granulated particles had a morphology similar to that of the schematic diagram in FIG. 2, in which a main granule 3 composed of a plurality of methotrexate crystal core particles 1 (m) that were bound and held together by the binder 2 was coated on the outside thereof with cornstarch as the coating particles 4.

The particle size distribution of the resulting granulated particles was examined with a laser diffraction/scattering type particle size analyzer, whereupon the average particle sizes were as follows: $d_{50}$=176 µm, $d_{10}$=131 µm and $d_{90}$=223 µm, indicating a high particle size uniformity. Thus, even when a polymeric substance having no gelling action (HPC) and a solvent other than water (ethanol) are used, it was confirmed that by using core particles that do not dissolve in this solvent (in this Example, particles of the pharmaceutically active ingredient methotrexate), uniform coating particles can be obtained. The developed interfacial area ratio Sdr of the resulting granulated particles was determined in the same way as in Example 1, whereupon the first measurement was 408 and the second measurement was 334, for an average value of 371.

Example 6

Aside from adding 2.5 g of wollastonite (Kansai Matec Co., Ltd.; product name, KGP-H65; $d_{50}$=6.3 µm; shape, acicular; aspect ratio, 10.6) as the core particles to the granulating solution, a granulating solution was obtained in the same way as in Example 3. Also, aside from using the same wollastonite as that making up the core particles in the fluidized bed as well, granulated particles were produced in the same way as in Example 3. The particle size distribution was measured, whereupon the average particle sizes were as follows: $d_{50}$=382 µm; $d_{10}$=252 µm; $d_{90}$=496 µm, indicating a high particle size uniformity. The developed interfacial area ratio Sdr of the resulting granulated particles was measured in the same way as in Example 1, whereupon the first measurement was 690 and the second measurement was 557, for an average value of 624.

[Evaluation of Segregation]

Using the granulated particles obtained in each of the above Examples and Comparative Examples, the dispersibility of the powder when mixed together with the excipients used at the time of preparation into tablets was visually evaluated according to the evaluation conditions below and, based on the following criteria, the granulated particles were judged as to whether they give rise to segregation. The results are shown in Table 1.

(Evaluation Criteria)
⊚: The granulated particles are uniformly dispersed throughout, with no segregation.
○: The granulated particles have dispersed without mutually adjoining, but slight unevenness in the dispersion density is observable.
Δ: Places where the granulated particles have clumped together and localized are observable.

X: The granulated particles have separated into a plurality of phases and are segregated.

<Evaluation Conditions>

The granulated compositions of Examples 1 and 3 to 6 and of Comparative Example 1 as well as Comparative Examples 3 and 4 below were added in an amount of 5 wt % or 15 wt % to the excipient D-mannitol (product name, Granutol S; $d_{50}$=83 μm) or lactose hydrate (product name, Dilactose R; $d_{50}$=171 μm) and mixed together by shaking for 5 minutes, following which the degree of dispersion of the granulated particles was visually evaluated and rated. Describing the test method more concretely, 9.5 g or 8.5 g of D-mannitol or lactose hydrate was weighed out into a 50 mL clear polypropylene threaded centrifuge tube and 0.5 g or 1.5 g of the granulated composition was placed on top, following which the threaded cap was closed and the tube was set in a tube rotator for 50-mL tubes and rotated for 10 minutes at a speed of 20 rpm. At this time, levofloxacin fine granules 10% "DSEP" (Daiichi Sankyo Co., Ltd.; developed interfacial area ratio Sdr measured in same way as in Example 1: first measurement, 21; second measurement, 50; average value, 36) was used as Comparative Example 3, and futraful enteric-coated granules 50% (Taiho Pharmaceutical Co., Ltd.; developed interfacial area ratio Sdr measured in same way as in Example 1: first measurement, 4; second measurement, 5; average value, 5) was used as Comparative Example 4. The visual degree of dispersion was evaluated using the color of the yellow particles characteristic to methotrexate as the indicator for Examples 1 and 3 to 6 and Comparative Example 1, using the characteristic light-yellow particle color for Comparative Example 3, and using the particle shape characteristic to extruded granulated particles as the indicator for Comparative Example 4.

TABLE 1

| | Excipient | | | |
|---|---|---|---|---|
| | D-Mannitol | | Lactose hydrate | |
| Content | 5% formulation | 15% formulation | 5% formulation | 15% formulation |
| Example 1 (Sdr: 350, 322; average = 336) | ○ | ◎ | ○ | ◎ |
| Example 3 (Sdr: 268, 328; average = 298) | ○ | ◎ | ○ | ○ |
| Example 4 (Sdr: 186, 240; average = 213) | ◎ | ◎ | ◎ | ◎ |
| Example 5 (Sdr: 408, 334; average = 371) | ○ | ○ | ○ | ◎ |
| Example 6 (Sdr: 690, 557; average = 624) | ○ | ○ | ○ | ○ |
| Comparative Example 1 (Sdr: 757, 3,500; average = 2,129) | X | Δ | X | X |
| Comparative Example 3 (Sdr: 21, 50; average = 36) | Δ | Δ | Δ | Δ |
| Comparative Example 4 (Sdr: 4, 5; average = 5) | Δ | X | X | X |

As is apparent in Table 1, it was confirmed that the granulated compositions of the invention in which the surface was covered with a particulate coating agent and which had suitable Sdr values do not readily give rise to segregation or separation when mixed with a different kind of powder and when stored.

[Relationship Between Size and Shape of Coating Particles and Sdr Value of Resulting Granulated Particles]

For the sake of reference, the relationship of the size of the coating particles (average particle size $d_{50}$) and their shape on an image taken with a microscope (aspect ratio) with the Sdr value of the granulated particles is shown in Table 2 below for the granulated compositions produced in Examples 1 and 3 to 6 and in Comparative Example 1.

TABLE 2

| | Coating particles | | | |
|---|---|---|---|---|
| | Material | Size ($d_{50}$) | Shape (aspect ratio) | Sdr of granulated particles |
| Example 1 | cornstarch | 21 μm | approx. spherical (1.18) | first time = 350, second time = 322 average = 336 |
| Example 3 | ethyl cellulose (Ethocel 100FP) | 19 μm | flaky (1.81) | first time = 268, second time = 328 average = 298 |
| Example 4 | talc (Talc ML115) | 6.3 μm | approx. spherical to flaky (1.3) | first time = 186, second time = 240 average = 213 |
| Example 5 | cornstarch | 21 μm | approx. spherical (1.18) | first time = 408, second time = 334 average = 371 |
| Example 6 | wollastonite (KGP-H65) | 6.3 μm | acicular (10.6) | first time = 690, second time = 557 average = 624 |
| Comparative Example 1 | crystalline cellulose (KC Flock W-200G) | 13 μm | prismoidal to acicular (13.9) | first time = 757, second time = 3,500 average = 2,129 |

As shown in Table 2, the size and also the shape (aspect ratio) of the coating particles have a relatively large influence on the Sdr value of the resulting granulated particles. It is apparent that as the aspect ratio of the coating particles becomes larger, the variability in the Sdr value increases.
[Evaluation of Feel on Tongue when Orally Disintegrating Tablets are Produced]

Using the granulated particles obtained in the above Reference Example, orally disintegrating tablets formulated as shown in Table 3 were produced by the method shown below. The feel on the tongue when the resulting orally disintegrating tablet was allowed to disintegrate within the mouth without taking water was sensory evaluated by five panelists, and the granulated particles of the invention were judged as to whether they cause an unpleasantly gritty sensation. In each of the panelists, the orally disintegrating tablet disintegrated after about 50 to 65 seconds in the mouth and a sensation of hard grains or an unpleasant gritty feel within the mouth was not experienced either during or after disintegration.
(Production of Orally Disintegrating Tablet)

The ingredients shown in Table 3 were each weighed out, placed in a 40 cm×70 cm clear polyethylene bag, sealed, and hand-mixed end-over-end for ten minutes to prepare a mixed powder for tableting. Orally disintegrating tablets having a flat circular shape (diameter, 7 mm; weight per tablet, 120 mg) were produced with a rotary tableting machine (PIC-COLA D8).

TABLE 3

| | Amount per tablet (mg) | Charged weight (g) | Percentage |
|---|---|---|---|
| Granulated composition in Reference Example | 12 | 6 | 10.00% |
| Gelatinized starch (Swel StarPD1, from Asahi Kasei Chemicals Corporation) | 4 | 2 | 3.33% |
| D-Mannitol (Granutol R, from Freund Corporation) | 75 | 37.5 | 62.50% |
| Crystalline cellulose starch (Ceolus ST100, from Asahi Kasei Corporation) | 20.6 | 10.3 | 17.17% |
| Precipitated silica (Adsolider 101, from Freund Corporation) | 1.8 | 0.9 | 1.50% |
| Crospovidone (Kollidon CL-F, from BASF) | 3.6 | 1.8 | 3.00% |
| Hydroxypropyl cellulose (HPC-SSL-SFP, from Nippon Soda Co., Ltd.) | 1.2 | 0.6 | 1.00% |
| Aspartame (PAL SWEET, from Ajinomoto Co., Inc. | 0.6 | 0.3 | 0.50% |
| Magnesium stearate (from Taihei Chemical Industrial Co.) | 1.2 | 0.6 | 1.00% |
| Total | 120 | 60 | 100.00% |

REFERENCE SIGNS LIST

1: core particle
2: binder
3: main granule
4: coating particle
m: pharmaceutically active ingredient or biofunctional ingredient
h: droplet of hydrophobic liquid in which pharmaceutically active ingredient or biofunctional ingredient is dispersed or dissolved

The invention claimed is:
1. A granule comprising one or more core particle, a plurality of coating particles and a binder for binding the core particles to each other and the core particles with the coating particles so as to maintain a granular form, wherein the coating particles adhere to the periphery of a main granule consisting of the core particles and the binder, the coating particles are insoluble in the binder and have an aspect ratio of not more than 11, the core particles or the binder or both contain a pharmaceutically active ingredient or a biofunctional ingredient, the coating particles are at least partially exposed on the outer periphery surface of the granule, and the granule has a developed interfacial area ratio Sdr of from 150 to 700, wherein said granule is formed by delivering a droplet of a granulating solution including said pharmaceutically active ingredient or said biofunctional ingredient and said binder into a fluidized bed in which coating particles are fluidized, and adhering the coating particles to the surface of the droplet to form said granule where said coating particles are at least partially exposed on said outer periphery of said granule.

2. The granule of claim 1, wherein the binder is a polymeric substance solution or polymeric substance dispersion which has a gel strength that is weak to a degree that the binder cannot by itself maintain a granular form or has a concentration that is dilute to a degree that the binder cannot exhibit gel strength.

3. The granule of claim 1, wherein the core particles contain a particulate pharmaceutically active ingredient or biofunctional ingredient.

4. The granule of claim 1, wherein the pharmaceutically active ingredient or biofunctional ingredient is dissolved or dispersed in a hydrophobic liquid and droplets of the hydrophobic liquid are dispersed in the binder.

5. The granule of claim 4, wherein the hydrophobic liquid is one or more selected from the group consisting of propylene glycol monocaprylate, propylene glycol dicaprylate, propylene glycol dicaprate, propylene glycol monolaurate, propylene glycol monooleate, benzyl benzoate, octyl decyl triglyceride, oleic acid, triethyl citrate, dimethyl polysiloxane, cinnamaldehyde, medium-chain mono/diglycerides, medium-chain fatty acid triglycerides, triacetin, piperonyl butoxide, diethyl phthalate, dibutyl phthalate, butyl phthalyl butyl glycolate, octyl dodecyl myristate and ethyl butyrate.

6. The granule of claim 1, wherein particles which are the same as the coating particles are included as the core particles in the main granule.

7. The granule of claim 1, wherein the main granule is formed of a binder obtained by dissolving a polymeric substance that lacks a gelling action in a solvent other than water and core particles containing particles of a pharmaceutically active ingredient or biofunctional ingredient that is insoluble in the solvent.

8. The granule of claim 1, wherein the coating particles are one or more powder selected from the group consisting of ethyl cellulose, cornstarch, rice starch, wheat starch, potato starch, calcium stearate, magnesium carbonate, low degree of substitution carboxymethyl starch sodium, sodium starch glycolate, silicic anhydride, magnesium silicate, diatomaceous earth, bentonite, zeolite, silicon dioxide, agar-agar powder, croscarmellose sodium, crospovidone and talc.

9. The granule of claim 1, wherein the binder is obtained by dissolving or dispersing in a solvent one or more polymeric substance selected from the group consisting of gelatin, carrageenan, agar-agar, polyethylene glycol, methyl cellulose, hydroxypropyl methylcellulose, hydroxypropyl cellulose, methacrylic acid copolymers, aminoalkyl methacrylate copolymers, ammonioalkyl methacrylate copolymers, ethyl acrylate-methyl methacrylate copolymers, hypromellose phthalate, hypromellose acetate succinate, cellulose acetate phthalate and polyvinyl acetate phthalate.

10. The granule of claim 1, wherein the granule is suitable for use for producing an orally disintegrating tablet.

11. The granule of claim 1, wherein the granule is incorporated into an orally disintegrating tablet.

12. The granule of claim 11, wherein the granule is incorporated into an orally disintegrating tablet having a flat circular shape.

13. The granule of claim 1, wherein the coating particles have a $d_{50}$ of 5 to 70 μm.

14. The granule of claim 1, wherein the coating particles have a $d_{50}$ of 10 to 30 μm.

15. The granule of claim 1, wherein the coating particles have an angle of repose of not more than 60°.

* * * * *